(12) United States Patent
Kawazu (10) Patent No.: US 6,790,583 B2
(45) Date of Patent: Sep. 14, 2004

(54) LIGHT ABSORBING PATTERN FILM COATED ARTICLE PRODUCTION METHOD AND LIGHT ABSORBING PATTERN FILM COATED ARTICLES

(75) Inventor: Mitsuhiro Kawazu, Osaka-fu (JP)

(73) Assignee: Nippon Sheet Glass Co., Ltd., Osaka-fu (JP)

( * ) Notice: Subject to any disclaimer, the term of this patent is extended or adjusted under 35 U.S.C. 154(b) by 163 days.

(21) Appl. No.: 09/887,967

(22) Filed: Jun. 22, 2001

(65) Prior Publication Data

US 2002/0025425 A1 Feb. 28, 2002

Related U.S. Application Data

(63) Continuation of application No. PCT/JP00/07413, filed on Oct. 24, 2000.

(30) Foreign Application Priority Data

Oct. 25, 1999 (JP) ......................................... H11-302265

(51) Int. Cl.$^7$ ............................................... C03C 17/23
(52) U.S. Cl. ...................... 430/198; 430/292; 430/295; 430/321; 430/330
(58) Field of Search ................................ 430/330, 321, 430/198, 292, 295

(56) References Cited

U.S. PATENT DOCUMENTS 4,134,747 A * 1/1979 Pierson et al. ............... 65/30 R
5,976,678 A * 11/1999 Kawazu et al. ............. 428/208

FOREIGN PATENT DOCUMENTS

| JP | 47-016816 B1 | 5/1972 |
| JP | 06-191896 A | 7/1994 |
| JP | 09-278488 A | 10/1997 |
| JP | 2000-272935 A | 10/2000 |

OTHER PUBLICATIONS

*Photoresponsive Formation of Gold Particles in Silica/Titania Sol–Gel Films*, H. Yanagi, Chem. Mater, 1998, 10, pp. 1258–1264.
*Hydrolysis and Polycondensation of Ethyl Silicates. 2. Hydrolysis and Polycondensation of ETS40 (ethyl silicate 40)*, J. Cihlar, Colloids and Surfaces A. Physicochemical and Engineering Aspects, 70 (1993) pp. 253–268 (minus 256 and 257).

* cited by examiner

Primary Examiner—John A. McPherson
(74) Attorney, Agent, or Firm—Edwards & Angell, LLP; David G. Conlin; Lisa S. Hazzard (57) ABSTRACT

A method of producing a light absorbing pattern film coated article with a transmitted light spectrum distribution corresponding to the pattern of a photomask, wherein a light absorbing film coating solution, containing a silicon oxide raw material, a titanium oxide raw material, which contains titanium oxide microparticles, and a gold microparticle raw material, is coated onto the surface of a substrate, the photomask is positioned on top of said coated film, ultraviolet light is irradiated onto said coated film, and said coated film is thereafter heated.

By the abovementioned method of producing, this invention can provide light absorbing film coated articles with various transmitted light spectra distribution while keeping the visible light reflectivity low.

6 Claims, 1 Drawing Sheet

LIGHT ABSORBING PATTERN FILM COATED ARTICLE PRODUCTION METHOD AND LIGHT ABSORBING PATTERN FILM COATED ARTICLES

This application is a continuation of international application number PCT/JP00/07413, filed Oct. 24, 2000. (status, abandoned, pending, etc.).

TECHNICAL FIELD

This invention concerns a method of producing film coated articles, in particular, light absorbing film coated articles that are suitable as the glass, etc. for window materials and mirrors for automobiles and other vehicles and buildings, optical glass products, ceramic products, optical parts, miscellaneous goods, etc.

BACKGROUND ART

A general method for obtaining microparticle dispersed glass using gold is the ion exchange method, with which an inorganic salt of gold is coated onto a glass surface and then baked to cause the gold in the inorganic salt to permeate into the glass substrate and cause colloidal coloration of the glass. There are also methods with which a gold salt is dissolved in a silicon alkoxide solution, this solution is coated onto a substrate, and heat treatment is performed to form a silicon oxide film that contains gold microparticles and is colored by the surface plasmons of the gold microparticles.

In particular, glass colored by the surface plasmons of gold microparticles is excellent in heat resistance and light resistance and has been used since priorly as colored glass or filter glass. It is generally known that the coloration due to absorption by the surface plasmons of gold microparticles is dependent on the refractive index of the medium that surrounds the gold microparticles, and for example among silicon oxide-titanium oxide films that contain gold microparticles, films, which are rich in titanium oxide and have a high refractive index, take on a blue color while films, which are rich in silicon oxide and have a low refractive index, take on a red color. It is also known that in this case, the coloration tone is changed and the principal wavelength of visible transmitted light is changed by the irradiating of ultraviolet rays after coating of a liquid that contains the silicon alkoxide, titanium oxide raw material, and gold salt but before the baking of the film (for example, Japanese Unexamined Patent Publication No. 6-191896).

Such glass, with which gold microparticles are dispersed in the glass or gold microparticles are dispersed in a film that is coated onto the glass, have been used since priorly as ornamental glass. However, the color of the glass that is obtained is normally a single color since the color is determined by the refractive index of the medium that surrounds the gold microparticles and the size and shape of the microparticles. Thus in the case where various color tones are to be provided within the same substrate, separate coating had to be performed for the respective color tones by means of flexo coating, screen printing, etc. This not only required highly precise patterning position control technology for prevention of the overlapping of films on top of each other but liquid compositions corresponding to the respective color tones had to be developed as well, making it disadvantageous in terms of cost to provide such color tones.

Furthermore, though the color tone obtained by gold microparticles varies with the refractive index of the medium and whether or not ultraviolet irradiation is carried out prior to the baking of the film, the reflectivity of the film also becomes higher as the refractive index of the medium becomes higher. However, for example, glass plates for automobiles and glass plates for construction, etc. are required in many cases to be low in visible light reflectivity for the purpose of appearance, and in the case where various transmission color tones are to be realized by changing the refractive index of the film, the highness of the visible light reflectivity of the film can become a disadvantage.

The present inventors have noted such problems and have come to complete this invention, the object of which is to provide light absorbing film coated articles, with which while keeping the visible light reflectivity low, various transmission color tones or various transmitted light spectrum distribution are realized in a single light absorbing film coated article or among individual or differing lots of light absorbing film coated articles.

DISCLOSURE OF THE INVENTION

This invention provides in a method of producing a light absorbing pattern film coated article having a transmitted light spectrum distribution corresponding to the pattern of a photomask, a method wherein a light absorbing film coating solution, which contains silicon oxide raw material, a titanium oxide raw material, containing titanium oxide microparticles, and gold microparticle raw material, is coated onto the surface of a substrate, positioning the abovementioned photomask on top of the abovementioned coated film, irradiating ultraviolet light onto the abovementioned coated film, and thereafter heating the abovementioned coated film.

The various components of the composition of the light absorbing film coating solution of this invention shall now be described.

Silicon oxide is necessary as the matrix material for fixing the gold microparticles in the film and also serves an important role as a low refractive index material that keeps down the visible light reflectivity of the film. A hydrolyzable, condensable silicon compound is used as the raw material of the silicon oxide. If the content of the silicon oxide raw material among the solids of the light absorbing film coating solution is too low, the visible light reflectance of the film will become too high. The content of silicon oxide as $SiO_2$ in the total amount of metal oxides and metal components in the light absorbing film coating solution is therefore preferably 45 to 93 weight % and more preferably 55 to 90 weight %.

As the raw material of the silicon oxide that forms the film in this invention, a silicon compound, etc., with which a strong, transparent film can be formed by the sol-gel method and is excellent in stability, that is, a silicon compound, etc., which can be subject to hydrolysis and condensation polymerization, can be used. Such a silicon compound shall be described more specifically below.

As an organosilicon compound, which is to be the raw material for silicon oxide, an alkoxide of silicon is favorable. Examples include tetralkoxysilanes, such as tetramethoxysilane, tetraethoxysilane, tetrapropoxysilane, and tetrabutoxysilane. A condensation product of such a compound (with $n \geq 2$, where n indicates the degree of condensation) or a mixture of such condensation products may also be used favorably. Examples of condensation products that can be used include hexaethoxydisiloxane (n=2), octaethoxytrisiloxane (n=3), decaethoxytetrasiloxane (n=4), and ethoxypolysiloxane (n≧5). Also, "Ethyl Silicate 40" (trade name; made by Colcoat Co., Ltd.), which is comprised of a mixture of a monomer (n=1) and condensation products (n≧2) [the composition in terms of weight ratios of this product is indicated in the reference, J. Cihlar, Colloids and Surfaces A: Physicochem. Eng. Aspects 70 (1993) pp. 253 to 268, as being 12.8 weight % monomer (n=1), 10.2 weight % dimer (n=2), 12.0 weight % trimer (n=3), 7.0 weight % tetramer (n=4), 56.2 weight % polymer (n≧5), and 1.8 weight % ethanol], etc. can be used favorably.

An alkyltrialkoxysilane, with which a part of the alkoxyl groups of an abovementioned compound has been substituted by an alkyl group or other hydrocarbon group, may also be used. Examples include compounds with which an alkoxyl group has been substituted by a straight chain or branched chain alkyl group, such as the methyl group, ethyl group, propyl group, butyl group, 2-ethylbutyl group, octyl group, etc., a cycloalkyl group, such as the cyclopentyl group, cyclohexyl group, etc., an alkenyl group, such as the vinyl group, aryl group, γ-methacryloxypropyl group, γ-acryloxypropyl group, etc., an aryl group, such as the phenyl group, toluyl group, xylyl group, etc., an aralkyl group, such as the benzyl group, phenetyl group, etc., or the γ-mercaptopropyl group, γ-chloropropyl group, γ-aminopropyl group, etc. Besides silicon alkoxides, silicon oxide microparticles, such as "Snowtex-OL," which is a silica sol made by Nissan Chemical Industry Co., Ltd., may also be used.

Titanium oxide is the component that raises the refractive index of the film and shifts the coloration (transmission color tone) by the gold microparticles from a red color to a blue-green color. Titanium oxide is also a component that increases the water resistance of the film. Titanium oxide is furthermore a component that increases the visible light reflectivity of the film coated glass article in accompaniment with the increase of the refractive index of the film.

In the case where gold microparticles are to be formed in the film, titanium oxide microparticles are greater in the degree of shifting the transmission color tone of the film from a red color to a blue-green color and smaller in the degree of increasing the visible light reflectivity of the film coated article in comparison to the same amount (as $TiO_2$) in the light absorbing film coating solution of a titanium oxide raw material besides titanium oxide microparticles. Thus by making titanium oxide microparticles be present in the light absorbing film coating solution at an amount as $TiO_2$ that is equal to or greater than the amount of a titanium oxide raw material besides titanium oxide microparticles, a gold microparticle dispersed film can be obtained that exhibits absorption in the optical wavelength range of 300 to 1200 nm and is low in visible light reflectance. Furthermore, by making titanium oxide microparticles be contained in the light absorbing film coating solution, the change of transmission color tone, by the change of the amount of ultraviolet ray irradiated after coating of the light absorbing coating solution but prior to the baking of the film, can be made extremely large.

If the amount of titanium oxide in the total weight of metal compounds (total weight as metal oxide and gold) in the light absorbing film coating solution is made too high, the refractive index of the film will become too high and the reflectivity will become too high. Thus the content as $TiO_2$ of the titanium oxide raw material is preferably 3 to 30 weight %, more preferably 5 to 25 weight %, and even more preferably 10 to 25 weight %. Titanium oxide microparticles are used at an amount of ½ or more, in other words, 50 weight % or more, more preferably 60 weight % or more, even more preferably 80 weight %, and most preferably 100 weight % of the abovementioned titanium oxide raw material (as $TiO_2$). An organic compound of titanium, such as a titanium alkoxide, titanium acetyl acetonate, titanium carboxylate, etc., may be used at an amount of less than 50 weight % of the abovementioned titanium oxide raw material.

Since the transparency of the film will be lost if the particle size of the titanium oxide microparticles to be used as the abovementioned titanium oxide raw material is too large, the average particle diameter of the titanium oxide microparticles is preferably 500 nm or less and 1 nm or more and more preferably 100 nm or less and 2 nm or more. Though a titanium oxide raw material (an organic compound of titanium) besides titanium oxide microparticles can shift the transmission color tone of the film towards a blue-green color, since the degree of shifting towards a blue-green color is less and the degree of increasing the visible light reflectivity of the film coated article is greater than that of microparticulate titanium oxide, the amount of use of an abovementioned organic titanium compound as the abovementioned titanium oxide raw material is preferably limited to a small amount as possible as has been mentioned above.

Examples of titanium oxide microparticles to be used as the titanium oxide raw material in this invention include commercially-sold water-dispersed sols, such as the photocatalytic titanium oxide microparticles made by Ishihara Sangyo Co., Ltd. (trade names "STS-01" (particle diameter (particle diameter by X-ray measurement): 7 nm), "STS-02" (particle diameter (particle diameter by X-ray measurement): 7 nm), and "CS-N"), the titania sol "M-6" (crystallite size: 5 nm), made by Tagi Chemicals Co., Ltd., etc. and commercially-sold titania sols, dispersed in a mixed solvent of water and alcohol and containing a binder, such as the photocatalytic titanium oxides made by Teika Co., Ltd. (trade names: "TKS201" (particle diameter: 6 nm) and"TKS202" (particle diameter: 6 nm)) and "ST-K01" and "ST-K03, " made by Ishihara Sangyo Co., Ltd.

The gold microparticles are the material that gives the film a light absorbing function, and if the amount thereof is too low, an adequate light absorbing function will not be obtained while if the amount thereof is too high, the durability of the film becomes low. Thus the content of the gold microparticle raw material (as gold (Au)) in the total solids content (as metal oxide and gold (Au)) of the light absorbing film coating solution is preferably 4 to 30 weight %, more preferably 6 to 25 weight %, and even more preferably 7 to 22 weight %.

Gold compounds, such as chloroauric acid, sodium chloroaurate, etc., can be used as the gold microparticle raw material, and among these chloroauric acid is most preferable in being stable and soluble. Gold colloid is not preferable for use in this invention since the change of the light transmission spectrum distribution by light irradiation (change of the transmitted light color tone in the visible light region) will be small.

In addition to the abovedescribed silicon oxide raw material, the abovedescribed titanium oxide raw material, and the abovedescribed gold microparticle raw material, the light absorbing film coating solution of this invention may contain the raw material of at least one oxide selected from the group comprised of cobalt oxide, zirconium oxide, aluminum oxide, iron oxide, bismuth oxide, zinc oxide, tin oxide, indium oxide, antimony oxide, vanadium oxide, chromium oxide, copper oxide, manganese oxide, nickel oxide, cerium oxide, boron oxide, tantalum oxide, tungsten oxide, ytterbium oxide, etc. at a total content as $Co_3O_4$, $ZrO_2$, $Al_2O_3$, $Fe_2O_3$, $Bi_2O_3$, ZnO, $SnO_2$, $In_2O_3$, $Sb_2O_3$, $V_2O_5$, $Cr_2O_3$, CuO, MnO, NiO, $Ce_2O_3$, $B_2O_3$, $Ta_2O_5$, $WO_3$, and $Yb_2O_3$, respectively, of 15 weight % or less and more preferably 10 weight % or less.

The film coating solution of this invention is obtained by respectively dissolving each of the raw materials described above in a solvent and mixing the resulting solutions at prescribed proportions. The total concentration of raw material (solids) in each solution is preferably 3 to 20 weight %. In the case where a silicon alkoxide is to be used for this invention, an inorganic acid, such as hydrochloric acid, nitric acid, sulfuric acid, etc. or an organic acid, such as acetic acid, oxalic acid, formic acid, propionic acid, p-toluenesulfonic acid, etc., is used at a concentration of preferably 0.01 to 15 weight % as the hydrolytic catalyst for the alkoxide. Since the above catalysts, etc. contain an adequate amount of water for hydrolysis, water does not to have to be added in particular normally.

The abovementioned solvent to be used in this invention depends on the film forming method. For example, a solvent that is low in evaporation rate is preferable as the organic solvent for the gravure coating method, flexo printing method, and roll coating method. This is because with a solvent with a high evaporation rate, the solvent will evaporate before adequate leveling occurs. The evaporation rate of a solvent is generally evaluated as a relative evaporation rate index with that of butyl acetate being set to 100. A solvent with which the value of this index is 40 or less is classified as a solvent with an extremely low evaporation rate, and such a solvent is preferable as the organic solvent for the gravure coating method, flexo printing method, and roll coating method.

Examples of such a solvent include ethyl cellosolve, butyl cellosolve, cellosolve acetate, diethylene glycol monoethyl ether, ethylene glycol, propylene glycol, tripropylene glycol, diacetone alcohol, tetrahydrofurfuryl alcohol, etc. Glycol solvents also act as leveling agents for the coat.

The solvent of the coat forming composition (coating solution) used in this invention preferably contains at least one type of such a solvent, and a plurality of the abovementioned solvents may be used to adjust the viscosity, surface tension, etc. of the coating solution. Also, a solvent that is high in evaporation rate and has a relative evaporation rate index of greater than 100, such as methanol (relative evaporation rate: 610; the same applies in the following), ethanol (340), or n-propanol (300) may be added to the above-described solvent with a relative evaporation rate index of 40 or less.

The film coating solution of this invention is applied onto the substrate by the coating method to be described below, and after positioning a photomask on top of the coat, light irradiation treatment is performed. As the ultraviolet ray light source for light irradiation, an ultraviolet irradiation device, which emits light of wavelengths of 250 to 400 nm and with which the intensity of the irradiated ultraviolet rays on the irradiated surface will be 1 $mW/cm^2$, can be used. The light from this light source is irradiated from 1 second to a few minutes onto the abovementioned coated film.

Heating is then performed for 1 to 200 minutes at a temperature of 200 to 700° C. to form a light absorbing thin film with a film thickness of 50 to 10000 nm. Though both the film portion (exposed region), which is exposed by the ultraviolet rays that pass through the ultraviolet ray transmitting area of the photomask, and the film portion (unexposed region), which is not exposed by the ultraviolet rays due to the ultraviolet ray blocking region of the photomask, are heated, the exposed region and the unexposed region will come to have different optical characteristics.

Glass, mirrors, quartz glass, semiconductors, ceramics, and resins can be used favorably as the substrates onto which the film coating solution of this invention is applied, and besides glass substrates of non-colored, transparent, soda lime silicate glass compositions, glass colored in green, glass colored in bronze, and glass plates provided with an ultraviolet ray absorbing property may be used as the glass substrate as well. As a glass substrate with an ultraviolet ray absorbing property, an ultraviolet ray/infrared ray absorbing glass plate, of a thickness of 1.0 mm to 5.5 mm and with which the transmittance of ultraviolet light of 370 nm wavelength (T370 nm) is 0 to 50%, the visible ray transmittance is 30 to 95%, and the solar ray transmittance is 30 to 85%, is used favorably. By coating the film forming composition of this invention onto such an ultraviolet ray absorbing glass plate, a film coated glass substrate with a high ultraviolet ray absorbing property can be obtained.

The coating method to be used in this invention is not limited in particular and examples include the spin coating method, dip coating method, spray coating method, printing methods, etc. Printing methods, such as the gravure coating method, flexo printing method, roll coating method, screen printing method, etc., are favorable as they are high in productivity and good in the efficiency of use of the coating solution composition.

The types and mixing proportions of the silicon compound, titanium oxide raw material, and gold microparticle raw material of this invention are preferably determined in consideration of the compatibility and stability of the solvent, titanium oxide raw material, gold microparticle raw material, and silicon compound, the optical factor of color, and the mechanical factors of wear resistance and chemical durability.

A description shall now be given for the case where a light absorbing pattern film coated article is to be produced using a photomask.

After coating the abovedescribed light absorbing film coating solution onto the substrate surface, a photomask is positioned on top of the coated film, and ultraviolet light is irradiated via the photomask onto the coated film for a prescribed amount of time. In order to accomplish exposure to the ultraviolet light and transfer the shape of the photomask onto the coated film surface accurately, the photomask is preferably positioned as close to the film surface as possible. In accordance with the differences according to location in the ultraviolet ray blocking rates of the photomask, regions that are exposed to high amounts of ultraviolet light and regions that are exposed to low amounts of ultraviolet light (or unexposed regions) are formed on the coated film. In regions that are exposed to high amounts of ultraviolet rays, a larger proportion of the gold microparticle raw material in the coated film undergo photoreduction and more gold microparticles are formed in comparison to regions that are exposed to low amounts of ultraviolet light.

In the subsequent heat treatment process, silicon oxide and titanium oxide are formed by the hydrolysis/condensation or thermal decomposition of the silicon oxide raw material and the titanium oxide raw material, and in the lowly exposed regions (or unexposed regions), the gold microparticle raw materials, which were not subject to photoreduction and have thus remained in their original form, undergo thermal decomposition to form gold microparticles of a form that differs from the photoreduced gold microparticles in the highly exposed regions.

As a result, a distribution in the proportions of the amounts of photoreduced gold microparticles and gold microparticles formed by thermal decomposition is formed on the coated film in correspondence to the pattern of the mask, and a light absorbing film having a transmission light spectrum distribution (transmitted light color tone distribution in the visible light range) corresponding to the above-mentioned pattern is obtained. Between the exposed regions and the unexposed regions of the light absorbing film, the exposed regions will tend to exhibit light absorption that is more shifted to the short wavelength side in comparison to the unexposed regions.

As the photomask to be used in the process of ultraviolet light irradiation, a film, screen film, or quartz glass thin plate, which is used for example to prepare a flexo-plate and with which a pattern is drawn on the surface of a transparent plate, can be used. As this photomask, a photomask, having a pattern that is comprised of ultraviolet light transmitting regions and ultraviolet light blocking regions and forms predetermined characters or figures, etc., a photomask, having a pattern with which the ultraviolet light transmittance varies continuously or discontinuously according to location, etc. may be used.

The pattern to be formed on the photomask may be a so-called large pattern, provided with ultraviolet light transmitting regions and ultraviolet light blocking regions of comparatively large dimensions that are suitable for forming a light absorbing pattern on the light absorbing film that can be observed by the naked eye and without the use of a magnifying glass, or may be a so-called small pattern, provided with ultraviolet light transmitting regions and ultraviolet light blocking regions of minute dimensions, with which the pattern itself is difficult to observe with the naked eye without the aid of a magnifying glass but which are suitable for obtaining various forms of light absorption. As a photomask of the latter type, a photomask, with which a pattern, comprised of microscopic ultraviolet light transmitting regions and microscopic ultraviolet light blocking regions, is formed by the forming of a distribution of numerous ultraviolet ray blocking regions with diameters (or minimum widths) of 0.5 to 100 $\mu$m by printing on a surface of film that is transparent: to ultraviolet rays or by the forming of a distribution of numerous ultraviolet ray transmitting holes with diameters (or minimum widths) of 0.5 to 100 $\mu$m on the surface of a film that blocks ultraviolet rays, can be used favorably. By the use of such a mask, a light absorbing film having a pattern with a definition of 0.5 to 100 $\mu$m in correspondence to the pattern of the mask may be prepared.

The reason as to why the difference in the transmission light spectrum distribution (the colorations (transmitted light chromaticity) in the visible range) of the exposed regions and unexposed regions is made large when titanium oxide microparticles are used in place of a titanium alkoxide while keeping the content (as $TiO_2$) of the titanium oxide raw material the same in the abovedescribed gold-compound-containing composition of the coating solution is presumed to be as follows.

First, an explanation shall be given for the case where heat treatment is performed without irradiating ultraviolet light after the coating on of the light absorbing film coating solution.

When the amounts of titanium alkoxide (a representative of titanium oxide raw materials besides titanium oxide microparticles) and titanium oxide microparticles are varied while keeping the content (as $TiO_2$) of the titanium oxide raw material constant in the abovedescribed gold-compound-containing composition of the coating solution, the light absorption peak at the long wavelength side (600 to 700 nm) becomes large and the light absorption peak wavelength shifts from 530 to 580 nm towards the long wavelength side (600 to 700 nm) as the content of titanium oxide microparticles is increased. That is, the transmission color tone of the light absorbing film shifts from red to blue and then furthermore to green.

If microparticulate titanium oxide does not exist and only a titanium alkoxide exists in the light absorbing film coating solution, the titanium alkoxide will coact with silica to form a matrix when the coated film is heated and the titanium oxide will therefore exist uniformly in the interior of the film. However, it is considered that when microparticulate titanium oxide exists in the light absorbing film coating solution, the titanium oxide microparticles will, by the interaction with the gold microparticles in the process of heat treatment of the coated film, come to be distributed near the gold particles or bond with the gold microparticles to form composite microparticles so that the titanium oxide will exhibit a non-uniform distribution inside the film.

The above is presumed from the following observation. That is, when the microparticles in the film are observed using a transmission electron microscope (TEM) outfitted with an energy dispersion type X-ray spectrum analyzer (EDX) and the EDX spectrum of the microparticles is measured, only gold (Au) is detected from the microparticles in a film, which does not use titanium oxide microparticles and exhibits a red transmission color tone, even if the same amount of titanium oxide is contained in the film. On the other hand, gold (Au) and titanium (Ti) are detected from the microparticles in a film, which uses titanium oxide microparticles as the titanium oxide raw material and exhibits a blue transmission color tone.

It is thus considered that the gold particles become surrounded by a medium that is high in the concentration of titanium oxide (and exhibits a higher refractive index than the refractive index of the film) so that the light absorption by the surface plasmons of the gold particles will exhibit an effect likened to dispersing the gold microparticles inside a film of a higher refractive index than the refractive index of the coated film and cause the shift value of the light absorption peak towards the long wavelength side to be extremely large.

The above description concerned the case where heat treatment is performed without performing light irradiation after coating of the light absorbing film coating solution. The case where light irradiation is performed upon positioning a photomask after coating of the light absorbing film coating solution and heat treatment is performed thereafter shall now be described.

In this case, though the conditions of the unexposed regions in the coated film will be the same as that described above, since the gold microparticle raw material in the exposed region in the coated film will be photoreduced where they are, an interaction of titanium oxide microparticles and gold microparticles will not occur in the subsequent heat treatment process. A large difference in the color tone of transmitted light will therefore arise between the unexposed regions and the exposed regions in the light absorbing film. Thus by using as the photomask, a photomask, having a pattern that is comprised of ultraviolet light transmitting regions and ultraviolet light blocking regions and forms predetermined characters or figures, etc., or a photomask, having a pattern with which the ultraviolet light transmittance varies continuously or discontinuously according to location, a continuous or discontinuous transmission light spectrum distribution or transmission color tone distribution, which corresponds to the abovedescribed pattern, will be formed in the light absorbing film.

Though a transmitted light color tone that is intermediate the transmitted light color tone of the unexposed regions in the light absorbing film and the transmitted light color tone of the exposed regions can be obtained by adjusting the amount of ultraviolet rays irradiated, the duration of irradiation, etc., and an intermediate color tone can also be obtained favorably by a mixing method similar to the dot matrix method in CRT's and liquid crystal displays as shall be described below.

In the case where a photomask, having a pattern with which large numbers of microscopic ultraviolet ray transmitting regions and microscopic ultraviolet ray blocking regions exist in a mutually adjacent and continuous manner, is used, light absorption (considered to be due mainly to gold microparticles obtained by photoreduction) at portions corresponding the abovementioned microscopic ultraviolet ray transmitting regions and light absorption (considered to be due mainly to gold microparticles due to thermal reduction and uneven distribution of titanium oxide microparticles) at portions corresponding to the abovementioned microscopic ultraviolet ray blocking regions occur in the light absorbing film. Since each of these microscopic light absorbing parts are extremely small in area and cannot be viewed as distinct parts by the naked eye without the aid of a magnifying glass, the color tone that is observed by the naked eye will be that resulting from a mixture of the transmitted light of the respective light absorbing parts. Thus by varying the area ratios of the ultraviolet ray transmitting regions and ultraviolet ray blocking regions of the photomask, the transmitted color tone that is obtained can be adjusted.

By thus making titanium oxide microparticles be present in the titanium oxide raw material (as $TiO_2$) of the light absorbing film coating solution, preferably at an amount of at least 50 weight %, a light absorbing pattern film coated article with a transmission light spectrum distribution or transmitted light color tone distribution that corresponds to the pattern can be obtained.

Though transmitted color tones that differ between the exposed regions and unexposed regions of the light absorbing film will also be exhibited when a titanium oxide raw material that does not contain titanium oxide microparticles is used in the light absorbing film coating solution, since it is considered that this difference will then be due merely to the difference between gold microparticles resulting from photoreduction and gold microparticles resulting from thermal decomposition, the difference in transmitted light color tone that is obtained will be extremely small in comparison to that obtained by the present invention.

With the gold-compound-containing composition of the abovedescribed film coating solution, if the content of titanium oxide is fixed, the difference in the transmission light spectra (difference in coloration in the visible range) of exposed regions and unexposed regions can be made greater by using titanium oxide microparticles in place of a titanium alkoxide as the titanium oxide raw material.

If this difference in coloration is expressed in the form of transmitted light chromaticity, that is, by the Lab color specification system, and the difference ($\Delta C$), between the transmitted light chromaticity ($a_1$, $b_1$) of an exposed region and the transmitted light chromaticity ($a_2$, $b_2$) of an unexposed region, is defined as $((a_1-a_2)^2+(b_1-b_2)^2)^{1/2}$, whereas the chromaticity difference ($\Delta C$) that can be obtained by using a titanium alkoxide for example as the titanium oxide raw material will only be approximately 2 to 3, a chromaticity difference ($\Delta C$) of 10 or more can be obtained by this invention that uses titanium oxide microparticles as the titanium oxide raw material Also, if the difference in coloration of the exposed regions and unexposed regions is expressed by the hue difference (angle; degrees), whereas the hue difference that can be obtained by using a titanium alkoxide for example as the titanium oxide raw material will only be approximately 8 to 10 degrees, a hue difference of 90 degrees or more can be obtained by this invention.

The case where a light absorbing pattern film coated article having a transmitted light color tone distribution is produced was mainly described above. However, this invention is not limited to this case, and by using photomasks having uniformly distributed microscopic ultraviolet ray transmitting regions and microscopic ultraviolet ray blocking regions and applying such photomasks that differ in the ratio of the total area of the ultraviolet ray transmitting regions and the total area of the ultraviolet ray blocking regions, light absorbing film coated articles that differ in the transmitted light color tone can be produced using light absorbing film coating solutions of the same blending composition.

BEST MODE FOR CARRYING OUT THE INVENTION

Though this invention shall now be described in more detail by way of specific examples, this invention is not limited thereto.

Preparation of Photomasks 1 to 3

A 10×10 cm paper, on which a 120-point bold letter "A" was printed in black, was copied at 100% magnification onto a transparent plastic sheet for overhead projector by means of a copier. This copied transparent sheet (thickness: 0.2 mm) was used as photomask 1. The character portions (large pattern) of the letter "A" of photomask 1 are the ultraviolet ray blocking regions and the other portions are the ultraviolet ray transmitting regions.

Photomask 2 was prepared by forming the left half of the letter "A" as ultraviolet ray blocking regions in the same manner as the abovedescribed photomask 1 and printing numerous circular ultraviolet ray blocking dots of 28.2 $\mu$m diameter at the respective intersections of square grid-like lattice so that the distance between the centers of dots will be 50 $\mu$m over the entire character surface of the right half of the letter "A". Approximately 50% of the area of the character portion of the right half of the letter "A" of photomask 2 blocks ultraviolet rays and the remaining approximately 50% of the area is made to transmit ultraviolet rays.

Also, numerous circular ultraviolet ray blocking dots of square shapes, with side lengths of 1 to 50 $\mu$m, were printed, at the respective intersections of square grid-like lattice so that the distance between the centers of dots will be 50 $\mu$m, onto a quartz glass plate of a thickness of 0.5 mm and dimensions of 10 cm×10 cm. The dots were printed with the side length of the dots at one side of this quartz glass plate being 1 μm so that the ultraviolet ray transmitting area percentage (ultraviolet ray transmitting area/mask area) will be approximately 100% at this portion, the side length of the square dots at the other side of the quartz glass plate being 50 μm so that the ultraviolet ray transmitting area percentage of this portion will be approximately 0%, and the side lengths of the dots becoming gradually larger from 1 μm to 50 μm from one side of the quartz glass plate to the other side (small pattern). The ultraviolet ray transmitting area percentage was thus made to vary gradually from 100% to 0% from one side of the quartz glass plate to the other side. This was used as photomask 3.

Preparation of the Coating Stock Solution

Silicon oxide raw material A: 62.6 g of "Ethyl Silicate 40" (made by Colcoat Co.), 55.04 g of ethyl cellosolve, and 7.52 g of 0.1 mol/L (0.1 normal) nitric acid ($HNO_3$) were stirred for two hours and after then adding 14.64 g of methyltriethoxysilane, 58.26 g of ethyl cellosolve, and 1.8 g of 0.1 mol/L nitric acid, stirring was performed for another 2 hours to prepare a silicon oxide raw material solution A.

Preparation of titanium oxide raw material C: Titanium isopropoxide chelated by acetyl acetone at a ratio of 2 moles of titanium isopropoxide to 1 mole of acetyl acetone was used as titanium oxide raw material C. This was then diluted with ethyl cellosolve so that the $TiO_2$ solids content will be 16.5 weight %.

EXAMPLE 1 AND COMPARATIVE EXAMPLE 1

The abovedescribed silicon oxide raw material A, titanium oxide microparticles ($TiO_2$ microparticles, average particle diameter: 7 nm, photocatalytic titanium oxide microparticles "STS-01," made by Ishihara Sangyo), titanium oxide raw material C, solvent (ethyl cellosolve), and chloroauric acid (gold microparticle raw material) were mixed at the amounts shown in Table 1 to prepare two types of coating solution. In Table 1, "EC" indicates ethyl cellosolve.

Each of the prepared coating solutions described above was coated onto a non-colored, transparent glass substrate (soda lime silicate float glass, visible ray transmittance Ya: 90.0%, solar ray transmittance Tg: 81.7%, ultraviolet ray transmittance Tuv (ISO): 55.7%, visible ray reflectance 8.0%, transmitted light chromaticity and lightness as expressed by the Lab color specification system: a=−1.41, b=0.32, L=95.1) of a thickness of 3.4 mm and dimensions of 10 cm×10 cm by means of a gravure coating device. After air drying, the abovedescribed photomask 1 was positioned on top of the abovementioned coated surface with an interval of approximately 1 mm in between and ultraviolet light from an Ushio UV irradiation device (central ultraviolet ray wavelength: 365 nm) was irradiated through the photomask 1 for approximately 30 seconds. The intensity of the ultraviolet rays on the irradiated surface was 10 mW/cm² as shown in Table 2.

After irradiation, the coated glass plates were subject to heat treatment at a temperature of 350° C. for 10 minutes as shown in Table 2. As a result, two colored glass plates, that is, the glass plate of Example 1, having a gold microparticle dispersed silica-titania film with which the letter "A" portions (unexposed regions) were colored in blue and the portions besides the letter "A" (exposed portions) were colored in pink, and the glass plate of Comparative Example 1, having a gold microparticle dispersed silica-titania film with which the letter "A" portions (unexposed regions) were colored in pink and the portions besides the letter "A" (exposed portions) were colored in reddish purple, were obtained. The compositions, refractive indices, and film thickness values of the gold-microparticle-dispersed films and the visible ray transmittance (Ya), solar ray transmittance (Tg), ultraviolet ray transmittance (Tuv), visible ray reflectance, color (transmittance), and other characteristics of the respective regions of the glass plates with colored films are shown in Tables 3 to 5. The film thickness was measured using a stylus.

The visible ray transmittance, solar ray transmittance, and visible ray reflectance were measured in accordance with JIS R 3106, the ultraviolet ray transmittance was measured in accordance with ISO Standard 9050, and the transmission chromaticity and reflection chromaticity were measured in accordance with JIS Z 8729. The transmitted light chromaticity difference ($\Delta C$) and the transmitted light hue difference between the exposed regions and unexposed regions were determined from the transmitted light chromaticity ($a_1$, $b_1$) of the exposed regions and the transmitted light chromaticity ($a_2$, $b_2$) of the unexposed regions and using the equations of $((a_1-a_2)^2+(b_1-b_2)^2)^{1/2}$ and $|\tan^{-1}(b_1/a_1)-\tan^{-1}(b_2/a_2)|$, respectively, The refractive index of the film was calculated using a value of 2.2 as the refractive index of titanium oxide and a value of 1.46 as the refractive index of silicon oxide in a matrix that does not contain any gold or silver microparticles. The colored films obtained in both Example 1 and Comparative Example 1 exhibited satisfactory results in terms of water resistance, chemical resistance, and wear resistance.

A comparison of Example 1 and Comparative Example 1 shows that the transmitted light chromaticity difference ($\Delta C$) between the exposed regions and the unexposed regions of Example 1 was 13.1 and thus greater than the value of 2.4 for Comparative Example 1, and that the transmitted light hue difference between the exposed regions and the unexposed regions of Example 1 was 126 degrees and thus greater than the value of 9 degrees for Comparative Example 1. Also, for both the glass surface reflectance (the visible light reflectance for light incident on the surface on which the light absorbing film was not coated) and the film surface reflectance (the visible light reflectance for light incident on the surface on which the light absorbing film was coated), the values exhibited by Example 1 were smaller than those exhibited by Comparative Example 1.

Figure 1:
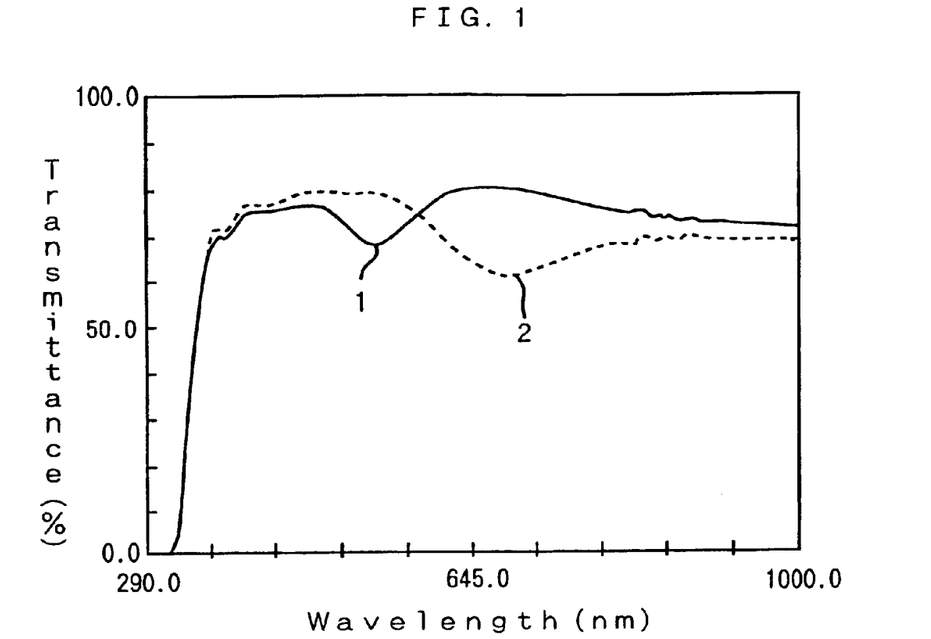
FIG. 1 is a graph, which shows the transmitted light spectra distribution of an exposed region and an unexposed region of a glass plate with light absorbing film of Example 1 of this invention.
Figure 2:
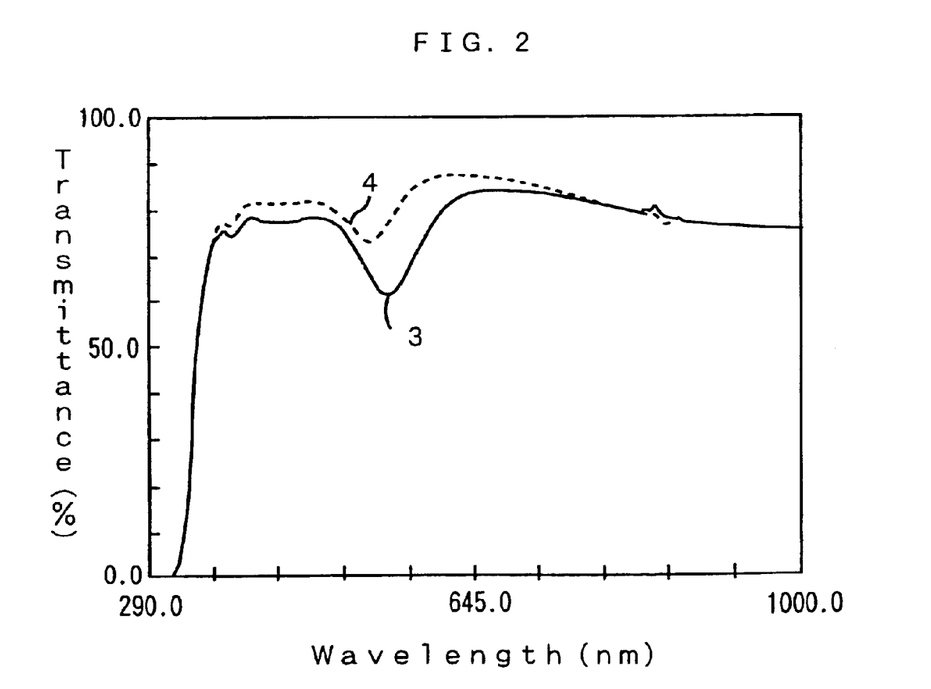
FIG. 2 is a graph, which shows the transmitted light spectra distribution of an exposed region and an unexposed region of a glass plate with light absorbing film of Comparative Example 1 of this invention.

The transmitted light spectrum distribution of an exposed region and an unexposed region of Example 1 are shown in FIG. 1. In FIG. 1, the solid line 1 indicates the transmittance of an exposed region and the dotted line 2 indicates the transmittance of an unexposed region. Also, the transmitted light spectrum distribution of an exposed region and an unexposed region of Comparative Example 1 are shown in FIG. 2. In FIG. 2, the solid line 3 indicates the transmittance of an exposed region and dotted line 4 indicates the transmittance of an unexposed region.

As can be understood from the above, with Comparative Example 1, with which a raw material chelated by acetyl acetate was used as the titanium oxide raw material, the difference in the transmitted light color tones of the exposed regions and the unexposed regions of the colored film was small in comparison to that for Example 1, with which titanium oxide microparticles were used.

A glass plate with light absorbing film was also made in the same manner as Example 1 but using photomask 2 instead of the photomask 1 used in Example 1. Though the transmission colors of this glass plate at the left half portion of the letter "A" (the unexposed region) and at the portions besides the letter "A" (the exposed region) were the same blue color and pink color, respectively, as Example 1, the right half portion of the letter "A" (semi-exposed region) was colored in bluish purple. Observation of this right half portion of the letter "A" (semi-exposed region) under a microscope showed the circular portions of approximately 28 μm diameter, which correspond to the ultraviolet ray blocking dots of 28.2 μm diameter of photomask 2, to be colored in blue and the film portions corresponding to the ultraviolet ray transmitting areas that surround the dots to be colored in pink. This blue-colored transmitted light and the same amount of pink-colored transmitted light thus become mixed to appear bluish purple in color to the naked eye.

EXAMPLE 2

Nine photomasks were prepared as follows. On the surface of each of nine ultraviolet ray blocking films (10 cm×10 cm), numerous, square-shaped ultraviolet ray transmitting holes, with the same side length in the range of 6.3 to 19 μm, were opened at the positions of the respective intersections of a square grid-like lattice so that the distance between the hole centers will be 20 μm and so that the [total area of ultraviolet ray transmitting holes]/[photomask area] will vary from 10 to 90% at 10% increments. For example, with a photomask with a [total area of ultraviolet ray transmitting holes]/[photomask area] of 10%, square-shaped ultraviolet ray transmitting holes of a side length of 6.3 μm were opened at the respective intersections of the abovementioned lattice.

Coating was performed using the same coating solution, glass substrates (11 substrates),and coating device, and after air drying, the abovedescribed nine types of filter were respectively positioned close to the film surfaces of nine samples and ultraviolet light was irradiated for approximately 30 seconds using the same UV irradiation device as Example 1. Irradiation was performed without a mask on one of the remaining glass substrates and irradiation was not performed on one of the other remaining glass substrate.

The respective ultraviolet light irradiated samples and the non-irradiated sample were heat treated for 2 minutes at a temperature of 650° C. as shown in Table 2, and 11 glass plates with gold-microparticle-dispersed silica-titania films, which were colored in bluish green to reddish purple, were obtained. The compositions, refractive indices, and film thickness values of the gold-microparticle-dispersed films and the visible ray transmittance (Ya), solar ray transmittance (Tg), ultraviolet ray transmittance (Tuv), visible ray reflectance, color (transmitted light), and other characteristics of the glass plates with light absorbing films were measured in the same manner as in Example 1, and the results thereof are shown in Table 3 and the rows indicated by Nos. 2-1 to 2-11 in Tables 6 and 7.

For example, the value of "10%" in the "Ultraviolet irradiation" column of No. 2-2 indicates that the [total area of ultraviolet ray transmitting holes]/[photomask area] of this mask is 10%. It can be understood that as the area exposed to ultraviolet rays increases with respect to the area of the irradiated film surface, the color tone varies gradually from bluish green to reddish purple. This indicates that the transmission color tone can be controlled freely by selecting the area of the exposed region.

Also, using the photomask 3, with which the ultraviolet ray transmitting area percentage was varied gradually from 0 to 100%, a glass plate with light absorbing film was produced in the same manner as in Example 2. With the transmission colors of this glass plate, a gradated transmission color tone distribution, which varies gradually from bluish green to blue, bluish purple, purple, reddish purple, and pink from the abovementioned other end side (ultraviolet blocking region: 100%) of the corresponding photomask 3 to the abovementioned one end side (one end side of the glass plate, ultraviolet transmitting region: 100%), was obtained. The optical characteristics of each of the respective regions of the glass with light absorbing film corresponding to each of 11 sections into which photomask 3 was divided from the abovementioned other end side to the abovementioned one end side coincided with those of Nos. 2-1 to 2-11 of Tables 6 and 7 for Example 2.

For example, the value of "10%" in the "Ultraviolet irradiation" column of No. 2-2 indicates the film portion corresponding to the ultraviolet ray transmission area percentage of 10% of the abovementioned photomask 3. By using this method, shade bands for automobiles, glass plates having a gradation with which the transmission color tone varies gradually, etc. can be prepared.

EXAMPLE 3

Besides using the abovementioned silicon oxide raw material A, titanium oxide microparticles (TiO$_2$ microparticles, average particle diameter: 7 nm, photocatalytic titanium oxide microparticles "STS-01," made by Ishihara Sangyo), titanium oxide raw material C, solvent (ethyl cellosolve), and chloroauric acid (gold microparticle raw material) in the amounts shown in Table 1 to prepare a coating solution, coating, photomask positioning, ultraviolet light irradiation, and heat treatment were carried out in the same manner as in Example 1. The compositions, refractive indices, and film thickness values of the gold-microparticle-dispersed film and the visible ray transmittance (Ya), solar ray transmittance (Tg), ultraviolet ray transmittance (Tuv), visible ray reflectance, color (transmitted light), and other characteristics of the glass plate with colored film are shown in Tables 3 to 5.

TABLE 1

| No. | Silicon oxide stock solution A (g) | Titanium oxide microparticles (g) | Titanium oxide raw material C (g) | Chloroauric acid (g) | EC (g) |
|---|---|---|---|---|---|
| Example 1 | 26.3 | 2.66 | 0 | 1.6 | 19.4 |
| Comparative Example 1 | 26.3 | 0 | 5.34 | 1.6 | 17.3 |
| Example 3 | 26.3 | 2.13 | 1.96 | 1.6 | 18.0 |

TABLE 2

| No. | UV irradiation treatment conditions (365 nm) | Heat treatment temperature |
|---|---|---|
| Example 1 | 10 mW/cm$^2$ | 350° C. |
| Comparative Example 1 | 10 mW/cm$^2$ | 350° C. |
| Example 2 | 10 mW/cm$^2$ | 650° C. |
| Example 3 | 10 mW/cm$^2$ | 350° C. |

TABLE 3

| Example No. | Film composition (weight % as oxide) | | | Refractive index | Film thickness (nm) |
|---|---|---|---|---|---|
| | SiO$_2$ | TiO$_2$ | Au | | |
| Example 1 | 71.8 | 14.4 | 13.8 | 1.56 | 150 |
| Comparative Example 1 | 71.7 | 14.5 | 13.8 | 1.56 | 140 |
| Example 2 | 71.8 | 14.4 | 13.8 | 1.56 | 140 |
| Example 3 | 71.8 | 14.4 | 13.8 | 1.56 | 144 |

TABLE 4

| No. Region | Ya (%) | Tg (%) | Tuv (%) | Transmission color tone | Transmission chromaticity and lightness (a/b/L) | Exposed region and Unexposed region Transmission color tone difference | Transmission hue difference |
|---|---|---|---|---|---|---|---|
| Example 1 | | | | | | | |
| Exposed region | 72.2 | 71.6 | 45.7 | reddish purple | 6.9/−2.8/84.4 | — | — |
| Unexposed region | 70.0 | 71.4 | 43.8 | blue | −6.2/−3.9/84.9 | 13.1 | 126 degrees |
| Comparative Example 1 | | | | | | | |
| Exposed region | 68.9 | 72.8 | 44.2 | pink | 6.5/−3.2/81.5 | — | — |
| Unexposed region | 71.8 | 73.3 | 42.8 | red | 4.8/−1.5/84.3 | 2.4 | 9 degrees |
| Example 3 | | | | | | | |
| Exposed region | 62.8 | 70.3 | 39.4 | pink | 7.1/−6.7/78.9 | — | — |
| Unexposed region | 61.6 | 70.1 | 40.4 | blue | −2.2/−8.1/79.4 | 9.5 | 118 degrees |

TABLE 5

| No. Region | Glass surface reflectance (%) | Glass surface reflection chromaticity (a/b) | Film surface reflectance (%) | Film surface reflection chromaticity (a/b) | Absorption peak wavelength (nm) |
|---|---|---|---|---|---|
| Example 1 | | | | | |
| Exposed region | 5.1 | 2.2/−1.6 | 8.4 | −2.0/−1.6 | 540 |
| Unexposed region | 5.4 | 0.8/0.8 | 6.4 | 2.1/0.9 | 680 |
| Comparative Example 1 | | | | | |
| Exposed region | 7.9 | 3.0/1.0 | 8.8 | 3.1/1.3 | 550 |
| Unexposed region | 8.3 | 4.0/3.1 | 9.3 | 7.3/3.7 | 530 |
| Example 3 | | | | | |
| Exposed region | 6.2 | 3.6/−2.1 | 7.2 | 4.6/−1.7 | 550 |
| Unexposed region | 6.5 | 1.9/−1.2 | 6.3 | 2.7/−4.1 | 600 |

TABLE 6

| No. | Ultraviolet irradiation | Ya (%) | Tg (%) | Tuv (%) | Transmission color tone | Transmission chromaticity and lightness (a/b/L) |
|---|---|---|---|---|---|---|
| Example 2 | | | | | | |
| 2-1 | 0% | 71.5 | 71.4 | 43.8 | bluish green | −5.2/−4.3/83.1 |
| 2-2 | 10% | 72.3 | 71.5 | 45.6 | bluish green | −4.4/−3.3/82.6 |
| 2-3 | 20% | 72.0 | 71.3 | 44.6 | bluish green | −3.7/−3.6/81.9 |
| 2-4 | 30% | 72.2 | 71.1 | 45.7 | bluish green | −2.5/−3.7/82.4 |
| 2-5 | 40% | 71.2 | 71.2 | 45.3 | blue | −1.3/−4.0/80.9 |
| 2-6 | 50% | 71.3 | 72.1 | 44.7 | blue | 0.1/−4.2/81.6 |
| 2-7 | 60% | 70.5 | 71.8 | 45.3 | bluish purple | 1.8/−4.4/82.8 |
| 2-8 | 70% | 70.4 | 72.1 | 44.2 | purple | 2.8/−4.9/83.1 |
| 2-9 | 80% | 70.0 | 71.6 | 43.9 | reddish purple | 4.3/−5.0/84.4 |
| 2-10 | 90% | 70.4 | 71.9 | 43.8 | pink | 5.9/−4.8/84.5 |
| 2-11 | 100% | 72.2 | 71.6 | 45.7 | pink | 6.9/−2.8/84.4 |

TABLE 7

| Example No. | Ultraviolet irradiation | Glass surface reflectance (%) | Glass surface reflection chromaticity (a/b) | Film surface reflectance (%) | Film surface reflection chromaticity (a/b) | Absorption peak wavelength (nm) |
|---|---|---|---|---|---|---|
| Example 2 | | | | | | |
| 2-1 | 0% | 5.4 | 0.8/0.8 | 6.4 | 2.1/0.9 | 610 |
| 2-2 | 10% | 5.5 | 0.9/1.3 | 7.5 | 1.5/0.8 | 550, 610 |
| 2-3 | 20% | 5.3 | 1.0/1.5 | 7.6 | 2.1/1.1 | 550, 610 |
| 2-4 | 30% | 5.6 | 1.2/0.7 | 8.1 | 1.8/1.1 | 550, 610 |
| 2-5 | 40% | 5.8 | 1.6/−0.6 | 7.8 | 1.1/0.6 | 550, 610 |
| 2-6 | 50% | 5.9 | 1.7/−1.3 | 7.5 | −1.8/−0.9 | 550, 610 |
| 2-7 | 60% | 6.1 | 1.6/−0.9 | 7.8 | −2.1/−0.9 | 550, 610 |
| 2-8 | 70% | 5.5 | 1.8/−1.2 | 8.1 | −1.8/−1.1 | 550, 610 |
| 2-9 | 80% | 5.4 | 1.9/−1.5 | 7.6 | −2.1/−2.1 | 550, 610 |
| 2-10 | 90% | 5.6 | 1.8/−1.3 | 8.2 | −1.5/−1.8 | 550, 610 |
| 2-11 | 100% | 5.1 | 2.2/−1.6 | 8.4 | −2.0/−1.6 | 550 |

INDUSTRIAL APPLICABILITY

As has been described above, the present invention provides in a method of producing a glass article coated with a silica light absorbing film containing gold microparticles, a method that enables the production of a light absorbing pattern film coated article, with which the optical characteristics of exposed regions and unexposed regions differ or with which the transmission color tone or transmitted light spectrum is made to vary gradually by the use of a graded pattern in the light irradiation process. The present invention also enables a plurality of light absorbing film coated articles that differ respectively in transmission color tone or transmitted light spectrum distribution without having to vary the composition of the light absorbing film coating solution, in other words, simply by using a light absorbing film coating solution of a fixed composition and using photomasks that differ in ultraviolet ray transmitting area percentage.

What is claimed is:

1. A method of producing a light absorbing pattern film coated article with a transmitted light spectrum distribution corresponding to the pattern of a photomask, wherein a light absorbing film coating solution, containing a silicon oxide raw material, a titanium oxide raw material, which contains titanium oxide microparticles, and a gold microparticle raw material, is coated onto the surface of a substrate, the photomask is positioned on top of said coated film, ultraviolet light is irradiated onto said coated film, and said coated film is thereafter heated.

2. A method of producing a light absorbing pattern film coated article as set forth in claim 1, wherein said light absorbing film coating solution contains the following as main components at the following weight % of solid components;

said silicon oxide raw material 45 to 93% (as $SiO_2$),
said titanium oxide raw material 3 to 30% (as $TiO_2$),
with at least 50 weight % (as $TiO_2$) of said titanium oxide raw material being titanium oxide microparticles, and
said gold microparticle raw material 4 to 30% (as Au).

3. A method of producing a light absorbing pattern film coated article as set forth in claim 2, wherein said light absorbing film coating solution contains, in addition to said silicon oxide raw material, said titanium oxide raw material, and said gold microparticle raw material, the raw material of at least one oxide selected from a group comprised of cobalt oxide, zirconium oxide, aluminum oxide, iron oxide, bismuth oxide, zinc oxide, tin oxide, indium oxide, antimony oxide, vanadium oxide, chromium oxide, copper oxide, manganese oxide, nickel oxide, cerium oxide, boron oxide, tantalum oxide, tungsten oxide, ytterbium oxide at a total content as $Co_3O_4$, $ZrO_2$, $Al_2O_3$, $Fe_2O_3$, $Bi_2O_3$, ZnO, $SnO_2$, $In_2O_3$, $Sb_2O_3$, $V_2O_5$, $Cr_2O_3$, CuO, MnO, NiO, $Ce_2O_3$, $B_2O_3$, $Ta_2O_5$, $WO_3$, and $Yb_2O_3$, respectively, of 15 weight % or less.

4. A method of producing a light absorbing pattern film coated article as set forth in any of claims 1 through 3, wherein said photomask has a pattern comprised of microscopic ultraviolet ray transmitting regions and microscopic ultraviolet ray blocking regions.

5. A method of producing a light absorbing pattern film coated article as set forth in claim 1, wherein said titanium oxide microparticles have an average particle diameter of 100 nm or less.

6. A method of producing a light absorbing pattern film coated article as set forth in claim 1, wherein said substrate is comprised of glass, ceramic, or resin.

* * * * *